Sept. 15, 1936.     A. FINEBERG     2,054,194

REMOVABLE ROLLER MOUNTING

Filed Oct. 1, 1934

INVENTOR.
Abraham Fineberg
BY Daniel G. Cullen.
ATTORNEY.

Patented Sept. 15, 1936

2,054,194

UNITED STATES PATENT OFFICE 2,054,194

REMOVABLE ROLLER MOUNTING

Abraham Fineberg, Detroit, Mich., assignor to Abraham Cooper, Maurice Aronsson, and Abraham Fineberg, trustees Application October 1, 1934, Serial No. 747,363

2 Claims. (Cl. 15—41)

This invention relates to improvements in roller mountings, and aims to provide a novel and useful removable roller mounting, particularly useful in carpet sweepers or the like as mountings for removable roller brushes.

Figure 1:
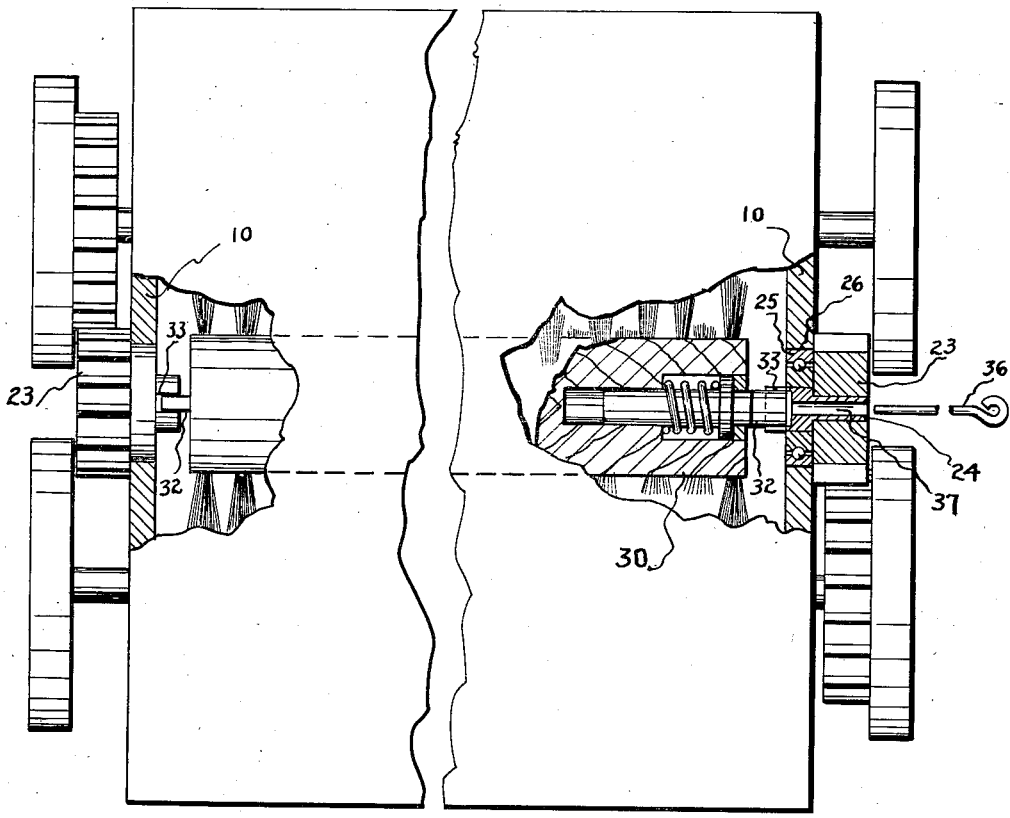
Figure 2:
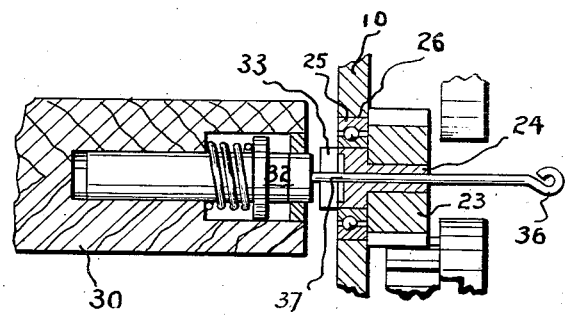

The invention will readily be apparent to those skilled in the art upon reference to the following detailed description of that which is disclosed in the appended drawing. In this drawing, Fig. 1 is a cutaway view of a sweeper base with a removably mounted roller shown therein;

Fig. 2 shows the manner of removing the roller from the base.

The base shown, which happens to be a carpet sweeper base, includes a pair of relatively thick sides 10, outside of which are small gears 23 fitted on stub shafts or axles 24 journaled in substantially frictionless roller bearings 25 secured in holes 26 of the sides 10, whereby the shafts 24 may be caused to rotate by means meshing with the gears 23.

Between the sides 10 and aligned with the oppositely disposed shafts 24 is a roller 30, shown as a brush, whose ends are provided with blades 32 which fit within kerfs 33 formed in the ends of the shafts 24 whereby the ends of the roller are supported by the sides 10 and are operatively coupled to the small gears 23, to rotate therewith. One blade 32 is fixed; the other blade 32 is mounted within the end of the roller in such a manner as to have longitudinal motion with respect to it, the blade normally being urged outwardly of the roller. When it is desired to remove the roller from the base a key 36 is thrust through a bore 37 of a shaft 24, provided for the purpose of receiving the key 36, so that the end of the key may engage the end of the blade 32 to push the blade 32 inwardly of the roller and uncouple it from the shaft 24, and thus permit the roller to be removed from the base.

It is observed that the key 36 is not ordinarily positioned within the bore 37 of the shaft 24, but is removable from the base.

What I claim is:

1. In combination, a base having opposed fixed sides, a short roller journalled in each of said sides and fixed against axial movement, said short rollers being axially alined, means on an end of each short roller outside of the adjacent base side by means of which each short roller may be rotated, and an elongated roller coupled to and releasably supported by the short rollers between the sides, the coupling between the elongated roller and one short roller including an end opening recess in the end of the elongated roller adjacent the aforementioned short roller, a slide disposed therewithin and having an end portion projecting beyond the end of the elongated roller, an expanding spring within the elongated roller recess tending to project the slide outwardly, means limiting the degree of projection of the slide, a recess in the inside end of the aforementioned short roller, the projecting end of the slide being received within such recess, such end and such recess being complementarily and non-circularly shaped to prevent relative rotation between the elongated roller and the aforementioned short roller, the latter having a bore opening through its ends and the recess and accessible from outside the casing to permit a tool to be inserted into the bore from outside the casing and engage the exposed end of the slide and cause it to be retracted axially, by compressing the spring, to release the coupling between the elongated roller and the last mentioned short roller, the exposed end of the slide presenting a surface to the bore of the adjacent short roller to be engaged by an inserted tool.

2. In combination, a base having opposed fixed sides, a short roller journalled in each of said sides and fixed against axial movement, said short rollers being axially alined, means on an end of each short roller outside of the adjacent base side by means of which each short roller may be rotated, and an elongated roller coupled to and releasably supported by the short rollers between the sides, the coupling between the elongated roller and one short roller including spring pressed, normally engaged, manually releasable means within the base, the last mentioned short roller having a bore communicating the releasable means with the outside of the base and through which may be inserted a releasing tool for releasing the means.

ABRAHAM FINEBERG.